United States Patent
Jiang et al.

(10) Patent No.: US 12,108,327 B2
(45) Date of Patent: Oct. 1, 2024

(54) DUAL-MODE ELECTRONIC DEVICE

(71) Applicant: SIGNIFY HOLDING B.V., Eindhoven (NL)

(72) Inventors: Dan Jiang, Westford, MA (US); Paul Gruijters, Eindhoven (NL); Dong Han, Newton, MA (US); Jin Yu, Lexington, MA (US); Yuting Zhang, Winchester, MA (US)

(73) Assignee: SIGNIFY HOLDING, B.V., Eindhoven (NL)

( * ) Notice: Subject to any disclaimer, the term of this patent is extended or adjusted under 35 U.S.C. 154(b) by 124 days.

(21) Appl. No.: 16/960,142

(22) PCT Filed: Jan. 4, 2019

(86) PCT No.: PCT/EP2019/050137
§ 371 (c)(1),
(2) Date: Jul. 6, 2020

(87) PCT Pub. No.: WO2019/137850
PCT Pub. Date: Jul. 18, 2019

(65) Prior Publication Data
US 2021/0076322 A1   Mar. 11, 2021

(30) Foreign Application Priority Data

Jan. 30, 2018 (EP) ..................... 18154016

(51) Int. Cl.
*H04W 52/02* (2009.01)
*H04W 56/00* (2009.01)
*H04W 88/06* (2009.01)

(52) U.S. Cl.
CPC ..... *H04W 52/0206* (2013.01); *H04W 52/028* (2013.01); *H04W 56/00* (2013.01); *H04W 88/06* (2013.01)

(58) Field of Classification Search
CPC .......... H04W 52/0206; H04W 52/028; H04W 56/00; H04W 88/06
See application file for complete search history.

(56) References Cited

U.S. PATENT DOCUMENTS

| | | | |
|---|---|---|---|
| 7,411,491 B2 | 8/2008 | Klabundle | |
| 2005/0064866 A1 | 3/2005 | Sun et al. | |
| 2005/0186906 A1* | 8/2005 | Hussmann | H04W 52/0232 455/90.1 |
| 2007/0232358 A1* | 10/2007 | Sherman | H04W 88/06 455/560 |
| 2007/0253399 A1* | 11/2007 | Deshpande | H04W 52/0216 370/347 |
| 2008/0181155 A1* | 7/2008 | Sherman | H04W 52/0229 370/311 |

(Continued)

FOREIGN PATENT DOCUMENTS

| | | |
|---|---|---|
| CN | 1799233 A | 7/2006 |
| CN | 1816187 A | 8/2006 |

(Continued)

*Primary Examiner* — Junpeng Chen

(57) ABSTRACT

An electronic device able to communicate using both a long-range and a short-range wireless communication technology. A transceiver of the electronic device switches its operation mode based on a power saving mode of the long-range wireless communication technology. In particular, the electronic device switches between a short-range mode and a long-range mode based on the power saving mode of the long-range communication technology.

14 Claims, 4 Drawing Sheets

(56) References Cited

U.S. PATENT DOCUMENTS

| | | |
|---|---|---|
| 2008/0198818 A1 | 8/2008 | Montemurro et al. |
| 2013/0242843 A1* | 9/2013 | Kojima .................. H04W 76/15 |
| | | 370/312 |
| 2014/0003318 A1 | 1/2014 | Desai |
| 2014/0315490 A1 | 10/2014 | Hughes et al. |
| 2015/0109991 A1 | 4/2015 | Miyazaki et al. |
| 2015/0319555 A1 | 11/2015 | Cordeiro et al. |
| 2015/0319674 A1 | 11/2015 | Hughes et al. |
| 2016/0227071 A1* | 8/2016 | Asakura ............. H04N 1/32496 |
| 2016/0234633 A1 | 8/2016 | Huang |
| 2016/0234749 A1 | 8/2016 | Singh et al. |
| 2017/0026948 A1 | 1/2017 | Yang et al. |
| 2017/0171782 A1* | 6/2017 | Mohamed ........... H04W 36/385 |
| 2018/0270188 A1* | 9/2018 | Kodaypak ........... H04L 63/0428 |
| 2019/0327679 A1* | 10/2019 | Gupta .................. H04W 76/27 |

FOREIGN PATENT DOCUMENTS

| | | |
|---|---|---|
| CN | 101188052 A | 5/2008 |
| CN | 101433015 A | 5/2009 |
| CN | 102573128 A | 7/2012 |
| CN | 107113726 A | 8/2017 |
| CN | 107222829 A | 9/2017 |
| CN | 107295455 A | 10/2017 |
| EP | 2372949 A1 | 10/2011 |
| EP | 2755429 A1 | 7/2014 |
| EP | 3018978 A1 | 5/2016 |
| JP | 2004180077 A | 6/2004 |
| JP | 2007067818 A | 3/2007 |
| JP | 2009535938 A | 10/2009 |
| JP | 2013546236 A | 12/2013 |
| KR | 100658581 B1 | 12/2006 |
| KR | 101071362 B1 | 10/2011 |

* cited by examiner

DUAL-MODE ELECTRONIC DEVICE

CROSS-REFERENCE TO PRIOR APPLICATIONS

This application is the U.S. National Phase application under 35 U.S.C. § 371 of International Application No. PCT/EP2019/050137, filed on Jan. 4, 2019, which claims the benefit of U.S. Patent Application No. 62/615,116, filed on Jan. 9, 2018 and European Patent Application No. 18154016.2, filed on Jan. 30, 2018. These applications are hereby incorporated by reference herein.

FIELD OF THE INVENTION

This invention relates to the field of electronic devices having a transceiver, and in particular to electronic devices capable of communicating using different wireless technologies.

BACKGROUND OF THE INVENTION

Short-range wireless communication technologies, such as ZigBee, Bluetooth, Wi-Fi, Visible Light Communication etc., are well known and used for electronic devices. However, with the advent of the Internet of Things (IoT), long-range wireless communication technologies have been of increasing interest in the field. Various technologies, for example NarrowBand-IoT and LTE enhancements for Machine-Type Communications (LTE-eMTC), have been developed and optimized for the small data transmission and wide range low-power communication desirable to IoT devices.

Long-range communication technologies of interest allow distant or centrally controlled servers to directly communicate with IoT devices. This may allow IoT devices to be positioned in remote locations, or for multiple IoT devices to be updated simultaneously.

However, a significant issue facing long-range communication technology uptake in IoT devices is the inherent latency, data consumption and cost of long-range communications. Latency in long-range communications limits the capabilities of an IoT device, for example, restricting real-time updating of the IoT device. The data consumption and/or cost of long-range communications effectively restricts the amount of data that can be sent to or received from the IoT device.

There is therefore a need for an improved system which reduces the reliance on long-range communication technologies in electronic devices.

SUMMARY OF THE INVENTION

The invention is defined by the claims.

According to examples in accordance with an aspect of the invention, there is provided an electronic device comprising a transceiver, a detection module and a switching unit. The transceiver is adapted to be switchable between: a long-range mode in which the transceiver communicates with at least one external device using a long-range wireless communication technology; and a short-range mode in which the transceiver communicates with at least one neighboring electronic device using a short-range wireless communication technology. The detection module is adapted to determine a power saving mode of the long-range wireless communication technology. The switching unit is adapted to switch the transceiver between the short-range mode and the long-range mode based on the determined power saving mode of the long-range wireless communication technology.

A power saving mode of a long-range communication technology is used to define an operating mode of a transceiver able to communicate using that long-range communication technology. In particular, an operating mode of the transceiver may be switched on the basis of one or more characteristics of the power saving mode.

The transceiver is switchable between a short-range mode and a long-range mode (i.e. operating modes), the switching being performed by a switching unit based on the power saving mode.

Switching an operating mode of the transceiver based on the power saving mode reduces an idle time of the transceiver, e.g. to avoid periods where the transceiver does not communicate with any devices. Moreover, it allows the transceiver to communicate using two separate wireless communication technologies, negating the need for a second dedicated transceiver.

Embodiments therefore provide an electronic device operable in two different communication channels, one long-range and the other short-range. The selection of in which communication channel to operate depends upon a power saving mode associated with the long-range communication channel.

Various characteristics of the power saving mode may be used to define how the switching is made to various advantages.

Preferably, the detection module is adapted to detect a period of time for which the transceiver will be unable to communicate using the long-range wireless communication technology due to the power saving mode; and the switching unit is adapted to switch the transceiver to the short-range mode for the duration of the period of time.

The power saving mode of the long-range wireless communication technology may define at least one period of time during which the transceiver is unable to communicate. For example, the power saving mode may identify periodic periods or a predefined, timed period during which no long-range communications are passed between the electronic device and the external device.

Switching the transceiver to the short-range mode during such periods reduces the dead or idle time of the transceiver, and maximizes a communication efficiency of the transceiver. Thus, when the transceiver is unable to communicate using the long-range communication technology (during the period defined by the power saving mode) the transceiver communicates using the short-range communication technology. In this way, the transceiver is able to communicate using both long-range and short-range communication technologies without significantly disrupting communication capabilities using either methodology.

Preferably, the switching unit is adapted to periodically switch the transceiver between the long-range mode and the short-range mode based on the power saving mode of the long-range wireless communication technology.

The power saving mode may define periodic intervals at which the external device and the electronic device communicate with one another. Between these periodic intervals the electronic device is unable to communicate with the external device using the long-range technology, such that there is a periodic time period during which the electronic device or transceiver does not use the long-range wireless communication technology.

Embodiments propose to switch the transceiver to the short-range mode during these time periods, so that the transceiver is able to periodically communicate with both the external server and the at least one neighboring electronic device and maximize an efficiency of the transceiver communication capabilities.

The periodicity of the switching by the transceiver may therefore be based on the power saving mode of the long-range wireless communication technology.

In at least one embodiment, the electronic device is adapted to receive signals from the at least one neighboring electronic device when operating in the short-range mode; and the switching unit is adapted to switch the transceiver from the short-range mode to the long-range mode in response to an override signal received from the at least one neighboring electronic device.

Preferably, the override signal represents a request from the at least one external device to communicate with the electronic device.

In this way, it is possible to send a message from the external server to the electronic device via the at least one neighboring electronic device. The at least one neighboring electronic device can thereby, when the transceiver operates in the short-range mode, act as a bridge between the external server and the electronic device.

In particular, the message may be an instruction or wake-up command from the external server to the electronic device to toggle the transceiver from a short-range mode to a long-range mode.

Such an embodiment ensures that the external server is able to communicate with the electronic device, even when operating in the short-range mode. Thus, a power saving mode for the long-range communication may be achieved without diminishing a capability of the electronic device to immediately communicate with the external device. Preferably, the electronic device is adapted to, in response to entering the short-range mode, broadcast a presence message to the at least one neighboring electronic device(s). The electronic device may be adapted to, prior to exiting the short-range mode, broadcast a leave message to the at least one neighboring electronic device(s).

Preferably, the electronic device is adapted to, prior to exiting the short-range mode, nominate one or more of the at least one neighboring devices of the network to act as a buffer for data which is communicated using the short-range wireless communication technology and intended for the electronic device.

Thus, one or more neighboring devices are able to buffer information or data for the electronic device when the electronic device is not operating in the short range mode. When the electronic device re-enters the short range mode, the one or more neighboring devices may pass the buffered data to the electronic device. In this way, the electronic device does not unintentionally miss any data, messages or other information transmitted over the short-range channel when it is operating in a long-range mode. The presence message may act as a prompt for buffered information to be transferred to the electronic device.

Preferably, the electronic device comprises a clock synchronization unit adapted to, when the transceiver is in the long-range mode, synchronize an internal clock of the electronic device with a clock of one of the at least one external devices.

In this way, the electronic device may synchronize with the external device. This ensures that a timing defined by a power saving mode (e.g. periodicity of or length of a sleep mode) is correctly monitored by the external device and the electronic device. This prevents the external device, for example, from mistakenly believing that the electronic device has switched to/from the long-range mode (e.g. due to an unsynchronized schedule). Such a mistaken belief might lead to unnecessary attempts to communicate with the electronic device (as such communications would not be received by an electronic device). Thus, an efficiency of the overall system is improved.

The electronic device and the at least one neighboring device may form, when the electronic device is operating in the short-range mode, a short-range network. Preferably, the short-range network comprises: a mesh network, a point-to-point network or a star network.

According to examples in accordance with another aspect of the invention, there is provided a method of operating a transceiver of an electronic device, wherein the transceiver is adapted to be switchable between a long-range mode in which the transceiver communicates with at least one external device using a long-range wireless communication technology; and a short-range mode in which the transceiver communicates with at least one neighboring electronic device using a short-range wireless communication technology. The method comprises determining a power saving mode of the long-range wireless communication technology; and switching the transceiver between the short-range mode and the long-range mode based on the determined power saving mode of the long-range wireless communication technology.

The method may be adapted wherein the step of determining a power saving mode comprises detecting a period of time for which the transceiver will be unable to communicate using the long-range wireless communication technology due to the power saving mode; and the step of switching the transceiver comprises switching the transceiver to the short-range mode for the duration of the period of time.

The step of switching the transceiver may comprise periodically switching the transceiver between the long-range mode and the short-range mode based on the power saving mode of the long-range wireless communication technology.

Proposed methods may further comprise receiving an override signal from the at least one neighboring electronic device; and switching the transceiver from the short-range mode to the long-range mode in response to the override signal.

Some methods comprise a step of synchronizing, when the transceiver is in the long-range mode, an internal clock of the electronic device with a clock of one of the at least one external devices.

According to examples in accordance with another aspect of the invention, there is provided a computer program comprising code means for implementing any method previously described when said program is run on a computer.

BRIEF DESCRIPTION OF THE DRAWINGS

Examples of the invention will now be described in detail with reference to the accompanying drawings, in which.

DETAILED DESCRIPTION OF THE EMBODIMENTS

According to a concept of the invention, there is proposed an electronic device able to communicate using both a long-range and a short-range wireless communication technology. A transceiver of the electronic device switches its operation mode based on a power saving mode of the long-range wireless communication technology.

Embodiments are at least partly based on the realization that long-range wireless communication technologies often operate according to a power saving mode, to minimize cost and power consumption. However, this significantly reduces a communication capability of an electronic device. The invention proposes to switch an operation mode of a transceiver between a long-range and a short-range mode so as to enable the transceiver to continually communicate in one of the two modes. For example, if a long-range communication is unavailable due to a power saving mode, the transceiver may be switched to the short range mode for the duration of the long range unavailability.

Illustrative embodiments may, for example, be employed in electronic devices of mesh, star or point-to-point networks. In one example, the mesh, star or point-to-point network is a lighting network having interconnected lighting devices (using a short-range technology) also able to communicate using a cellular service (using a long-range technology).

Figure 1:
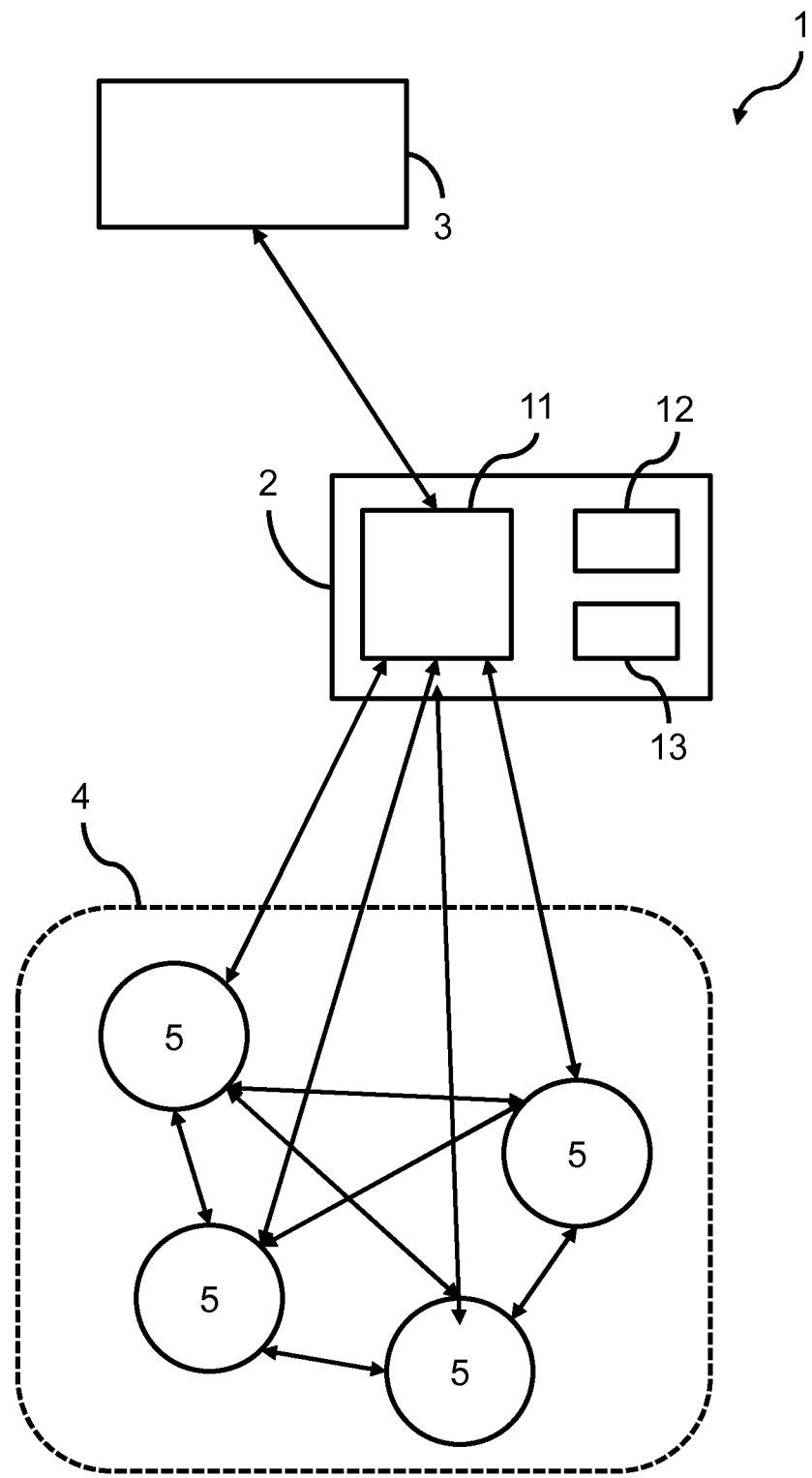
FIG. 1 shows a communication network comprising an electronic device according to an embodiment of the invention.

FIG. 1 illustrates an overall communication network 1 comprising an electronic device 2, an external device 3 and a network 4.

The illustrated network 4 is a mesh network. However, the network 4 may instead be any other suitable communication network operating according to other known short-range based network topologies, such as a star, ring, daisy chain or point-to-point network.

The electronic device 2 is adapted to communicate with both the external device 3 using a long-range wireless communication technology, such as NarrowBand-IoT and LTE enhancements for Machine-Type Communications (LTE-eMTC) technologies. The communication with the external device 3 may therefore be over a long-range wireless communication channel.

The electronic device 2 is also adapted to communicate with at least one neighboring device 5 on the network 4 using a short-range wireless communication technology, such as Bluetooth, ZigBee, Wi-Fi or Visible Light Communication methodologies. When communicating with devices on the network 4, the electronic device may be considered a node of the network 4. Communication with the neighboring device(s) 5 on the network 4 may therefore be over a short-range wireless communication channel.

The long-range wireless communication technology/channel and the short-range wireless location technology/channel operate on different basebands, according to known concepts.

The electronic device 2 communicates using a transceiver 11. The transceiver is adapted to be switchable between a long-range wireless communication mode ("long-range mode") and a short-range wireless communication mode ("short-range mode"). In the long-range wireless communication mode, the electronic device 2 externally communicates using only the long-range wireless communication technology ("long-range technology"). In the short-range wireless communication mode, the electronic device communicates using only a short-range wireless communication technology ("short-range technology").

Thus, the transceiver 11 of the electronic device 2 is switchable between a mode in which it can communicate with the external device 3 (long-range mode) and a mode in which it can communicate with neighboring devices of the network 4 (short-range mode). Preferably, the transceiver 11 is unable to communicate with the network 4 and the external device 3 at the same time. That is, the transceiver 11 may be unable to communicate using the long-range and short-range communication technologies at a same time.

The electronic device 2 also comprises a detection module 12 adapted to determine (characteristics of) a power saving mode of the long-range technology and a switching unit 13 adapted to switch the transceiver between the short-range mode and the long-range mode based on the determined power saving mode.

In order to save power or cost, devices such as the external device 3 or the electronic device 2, able to communicate using a long-range technology, can employ various power saving modes or techniques. A power saving mode defines how or when communications can be made using a long-range technology with the intent of reducing a power or cost requirement of operating the long-range technology.

One example is a discontinuous reception (DRX) technique, in which a transceiver only monitors for communications or transmits communications at a specified time interval. In exemplary techniques, the specified time interval is a maximum of 2.56 seconds.

Another example is an enhanced discontinuous reception (eDRX), in which communications on a first long-range channel (e.g. LTE-eMTC) are checked at a first time interval and communications on a second long-range channel (e.g. NB-IoT) are checked at a second time interval. Typically the first time interval is around 48 minutes and the second time interval is around three hours.

In yet another example, a transceiver 11 of the electronic device 2 may be operable in a sleep mode (alternative labels include: a sleep state or a low-power mode), being a state where no communication with the external device 3 is possible ("no-communication state") whilst maintaining an attachment and registration to the external device. For example, the transceiver may keep a communication link with the external device open or remain registered on the network. The transceiver may, for example, enter into the sleep mode in response to a predetermined period of time passing without data communication on the long-range channel. The transceiver may enter the sleep mode for a predetermined period of time (e.g. one hour, one day or one week), i.e. a timed low-power mode. Such a configuration is particularly important for extremely low-power devices (such as temperature sensors) which only need to sporadically communicate with a long-range external device, e.g. in the event of a hazardous sensing value being detected such as an excessively high temperature.

In another example, the power saving mode may restrict communication capabilities over a long range channel (e.g. limit to only a 2G connection even if a 3G connection is available). This restriction may, for example, be periodic or for a predetermined period of time.

Thus, the power saving mode may be a periodic power saving mode (DRX or eDRX techniques) or a dynamic power saving mode (e.g. entering into a sleep state in response to no communications occurring for a predetermined period of time).

For the DRX and eDRX techniques, the transceiver may be in a sleep mode (with respect to the long range communication) during the time intervals between the communications with the external device.

The detection module 12 may determine (characteristics of) the power saving mode based on a signal from a scheduler of the transceiver, e.g. indicating it will enter a sleep state. Alternatively, the detection module may obtain metadata of communications between the external device and the electronic device, which may indicate an identity of the power saving mode or from historic communication between the external device and the electronic device (e.g. indicating a periodicity of a sleep mode, which identifies the power saving mode). In other embodiments, the detection module determines the power saving mode based on the type of long-range wireless communication technology (e.g. to limit to known power saving modes of the wireless communication technology). In some examples, the electronic device 2 may store a configuration parameter indicating the power saving mode profile it is supposed to use, i.e. to indicate a compatible power saving mode for the electronic device 2.

The present invention recognizes that a power saving mode of the long-range wireless communication technology restricts the communication capabilities of the transceiver.

By way of example, a typical DRX technique results in a transceiver being unable to communicate during the interval between monitoring for communications and/or issuing communications. This will adversely affect a latency of instructions to the transceiver, and thereby to the electronic device.

The detection module 12 and/or the switching unit 13 may determine how long the transceiver will be unable to communicate using a long-range technology due to the power saving mode. For the period of time that the transceiver is unable to communicate using the long-range technology, the transceiver is switched to the short-range mode. This increases an efficiency of the transceiver, allowing it to communicate on two different channels effectively.

Some embodiments propose that, during the gaps between periodic intervals defined by the power saving mode, the transceiver enters into the short-range mode, and communicates with the network 4.

Other embodiments propose that, upon the long-range wireless communication technology entering a timed low-power mode or timed sleep mode, the transceiver switches to the short-range mode for the duration of the timed low-power mode.

Yet other embodiments propose to determine a period of time required for the transceiver of the electronic device to communicate a predetermined amount of data (based on the power saving mode), and periodically switching to the long-range mode for that duration before switching back to the short-range mode. This is particularly useful for low-power sensors, which may require a certain amount of data to be transmitted at periodic intervals. The power saving mode may restrict how the low-power sensor is able to communicate (e.g. restricted data transfer rate).

Switching from the long-range mode to the short-range mode may begin a timer or countdown for switching back to the long-range mode. The length of the timer/countdown depends upon the power saving mode of the long-range wireless communication technology. In particular, the length of the timer/countdown may be defined by a length of time during which the transceiver is unable to communicate with the external device due to the power saving mode. Upon the timer/countdown elapsing, the transceiver is switched back to the long-range mode.

Thus, the switching unit 13 may generally operate the transceiver 11 in the long-range mode, and switch it to the short-range mode when communications in the long-range mode are restricted due to a power saving mode (detected by the detection module 12). The switching unit 13 switches the transceiver 11 back to the long-range mode when communications in the long-range mode are no longer restricted in accordance with the power saving mode.

The power saving mode of the long-range technology therefore controls or defines a switching of the transceiver between the short-range mode and the long-range mode.

In particular embodiments, where the power saving mode is one that only permits periodic communications between the transceiver 11 and the external device 2, the power saving-mode defines a periodicity of the switching between the short-range mode and the long-range mode.

By switching the transceiver 11 between the short-range mode and the long-range mode, the switching unit 13 can ensure that the electronic device 2 can continually communicate with at least one other device, including the external device 3 and the network 4. This essentially optimizes the usage of radio resources of the transceiver for communication, whilst ensuring that the electronic device 2 to communicate over a long-range communication channel (e.g. with the external device 3).

Embodiments also avoid the need for providing a transceiver for each type of communication technology.

Preferably, when the electronic device 2 is operating in the long-range mode, it is viewed by nodes of the network 4 as operating in a sleep-state. Similarly, when operating in the short-range mode, the electronic device 2 is perceived by the external device 3 as operating in a sleep-state (e.g. in accordance with the power saving mode).

Figure 2:
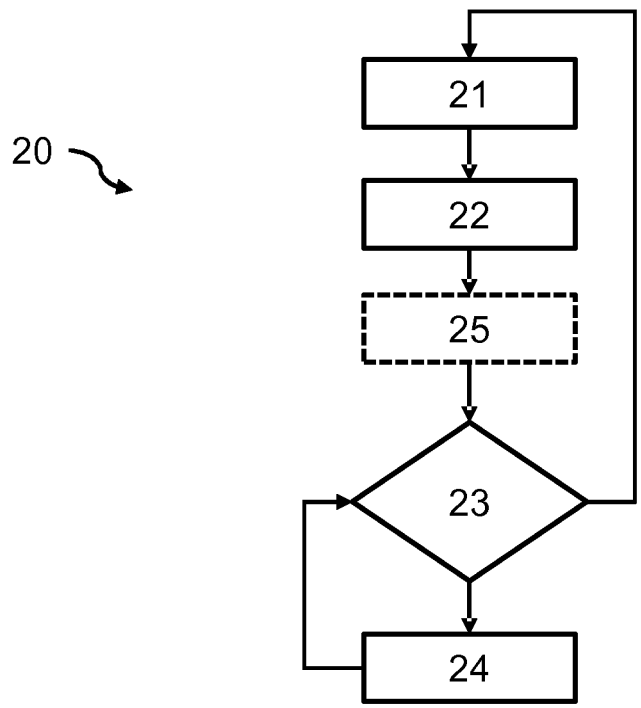
FIG. 2 is a flow chart of a method according to an embodiment.

FIG. 2 illustrates a method 20 for operating a transceiver of an electronic device previously described, according to an embodiment of the invention.

The method 20 comprises a step 21 of operating the transceiver in a long-range wireless communication mode, in which the transceiver communicates using a long-range communication technology.

The method 20 comprises a step 22 of determining or detecting a power saving mode of the long-range communication technology.

Step 22 may comprise, for example, determining a time period during which communication using a long-range technology is restricted due to the power saving mode of the long-range technology. This may, for example, be a period between communications using the long-range communication technology (an indication of a power saving mode) or determining a length of an upcoming sleep mode.

The method comprises, in step 23, determining whether to place, keep or switch the transceiver in/to the short-range mode based on the power saving mode. In the short-range mode, the transceiver operates using a short-range wireless communication technology.

By way of example, step 22 may comprise determining a time period during which communication using a long-range technology is restricted due to the power saving mode of the long-range technology (i.e. a length of a sleep mode). Step 23 may comprise determining whether or not the transceiver is in that time period. In the event that the transceiver is in that time period, the method moves to step 24, otherwise the method reverts back to step 21.

By way of another example, switching from the long-range mode to the short-range mode may be triggered by the transceiver entering into a "no-communication state" or "sleep state" with respect to the external device. This switching may trigger a timer/countdown, the length of which depends upon the power saving mode. Upon the timer/countdown elapsing, the transceiver may be switched to the long-range mode. Step 23 may therefore comprise determining whether the timer/countdown is ongoing or has elapsed.

The method comprises, in step 24 and in response to the determination in step 23 being positive, operating in the short-range mode.

Method 20 may further comprise a step 25 of synchronizing an internal clock of the electronic device to a clock of the external device. This advantageously ensures that the switching between the long-range and short-range modes is made synchronously with a power saving mode of the long-range technology from the perspective of the external device.

By way of example, the power saving mode of the long-range technology may only allow communications at 2.8 second intervals. Synchronizing the internal clock of the electronic device with that of the external device reduces the likelihood that the 2.8 second interval monitored by each device will drift apart (e.g. due to natural differences in clock speeds).

Figure 3:
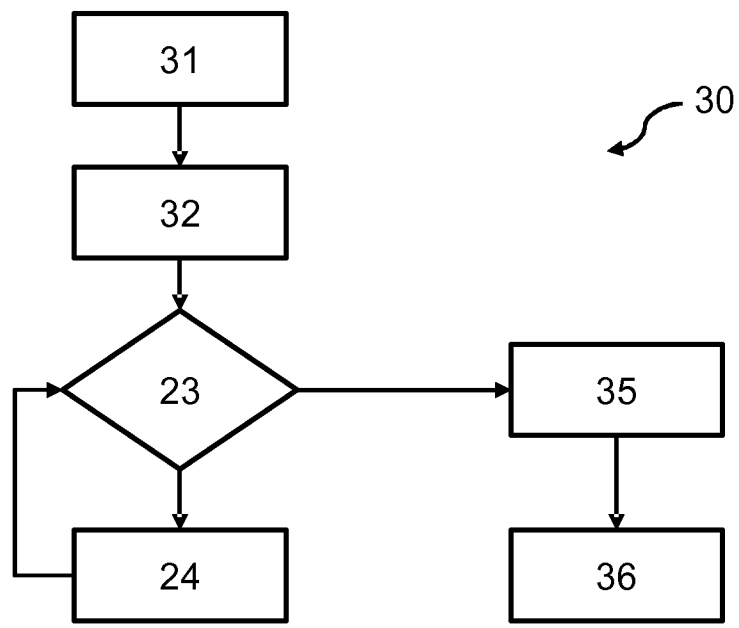
FIG. 3 is a flow chart illustrating further steps of a method according to an embodiment.

FIG. 3 illustrates further steps to a method 30 of operating a transceiver of an electronic device. In particular, FIG. 3 illustrates procedures to be carried out upon entering and exiting the short-range mode.

Step 31 is a step of entering the short-range mode. Step 31 may comprise switching the transceiver from the long-range mode to the short-range mode.

Step 32 comprises broadcasting, from the transceiver, a presence message to at least one neighboring electronic device. This advantageously indicates to other nodes of a network that the electronic device is able to communicate with the neighboring devices on the network (using the short-range wireless communication technology). The neighboring electronic device is then able to communicate with the electronic device.

Preferably, the presence message comprises information on the expected duration that the electronic device will operate in the short-range mode. The expected duration is determined based on the power saving mode (e.g. which may indicate a duration for which a long-range communication is not possible). Provision of this information advantageously permits neighboring electronic device(s) to schedule, arrange or determine when data, such as device updates, may be passed to the electronic device.

The step 23 comprises determining whether to keep or place the transceiver in the short-range mode. This may be done using any method previously described, such as determining whether a particular time period has elapsed or not.

Step 24 comprises operating the receiver in the short-range mode, as previously described, and is performed in response to step 23 determining that the transceiver should be kept or placed in the short-range mode.

In the event that step 23 determines to no longer keep or place the transceiver in the short-range mode, the method 30 moves to step 35. Step 35 comprises broadcasting a leave message to the neighboring electronic device(s). The leave message may comprise, for example, information on the expected duration that the electronic device will no longer operate in the short-range mode. The leave message may indicate that the electronic device will operate in a sleep-mode (from the perspective of the other devices/nodes in the network). In some examples, step 35 instead or additionally comprises nominating/delegating another node or neighboring device of the network to act as a buffer device. The nominated buffer device may be adapted to buffer or temporarily store data for the electronic device (e.g. communications from other nodes of the network) until the electronic device returns to the short-range mode. The buffered data may then be delivered to the electronic device upon its re-entry to the short-range mode (e.g. as announced by the presence message in step 32). The presence message may thereby comprise a request for buffered data from the nominated buffer device.

Thus, the leave message may comprise information which nominates a neighboring device to act as a buffer device. Alternatively, this information may be transmitted separately to the leave message.

Such an embodiment advantageously ensures that the electronic device receives relevant information transmitted thereto.

Following step 35, the method 30 moves to a step 36 of switching the transceiver to the long-range wireless communication mode.

When the transceiver is operating in the short-range mode, the electronic device may communicate with any one or more neighboring electronic devices using a short-range wireless communication technology, such as ZigBee, Bluetooth, Wi-Fi, IEEE 802.11, Visible Light Communication, or the IEEE 802.15.4 technology standard. Mesh or star or point-to-point networks, suitable for short-range communication technologies, are well known in the art, and may comprise a central bridge through which the devices communicate with one another.

In particular, the electronic device may send/receive application data (such as data logs, firmware, configuration data and so on) to/from neighboring devices in a network using a broadcast/multicast or unicast methodology. When operating according to the unicast methodology, the destination node or device typically needs to acknowledge the reception of the data in the application layer.

The external device may, for example, be a base station of a cellular network or an end server for communicating with the electronic device. The long-range wireless communication technology is preferably a cellular communication technology, as this provides reliable transfer of information. Examples of appropriate cellular technologies include 2G, 3G, 4G, or 5G telecommunication protocols.

Figure 4:
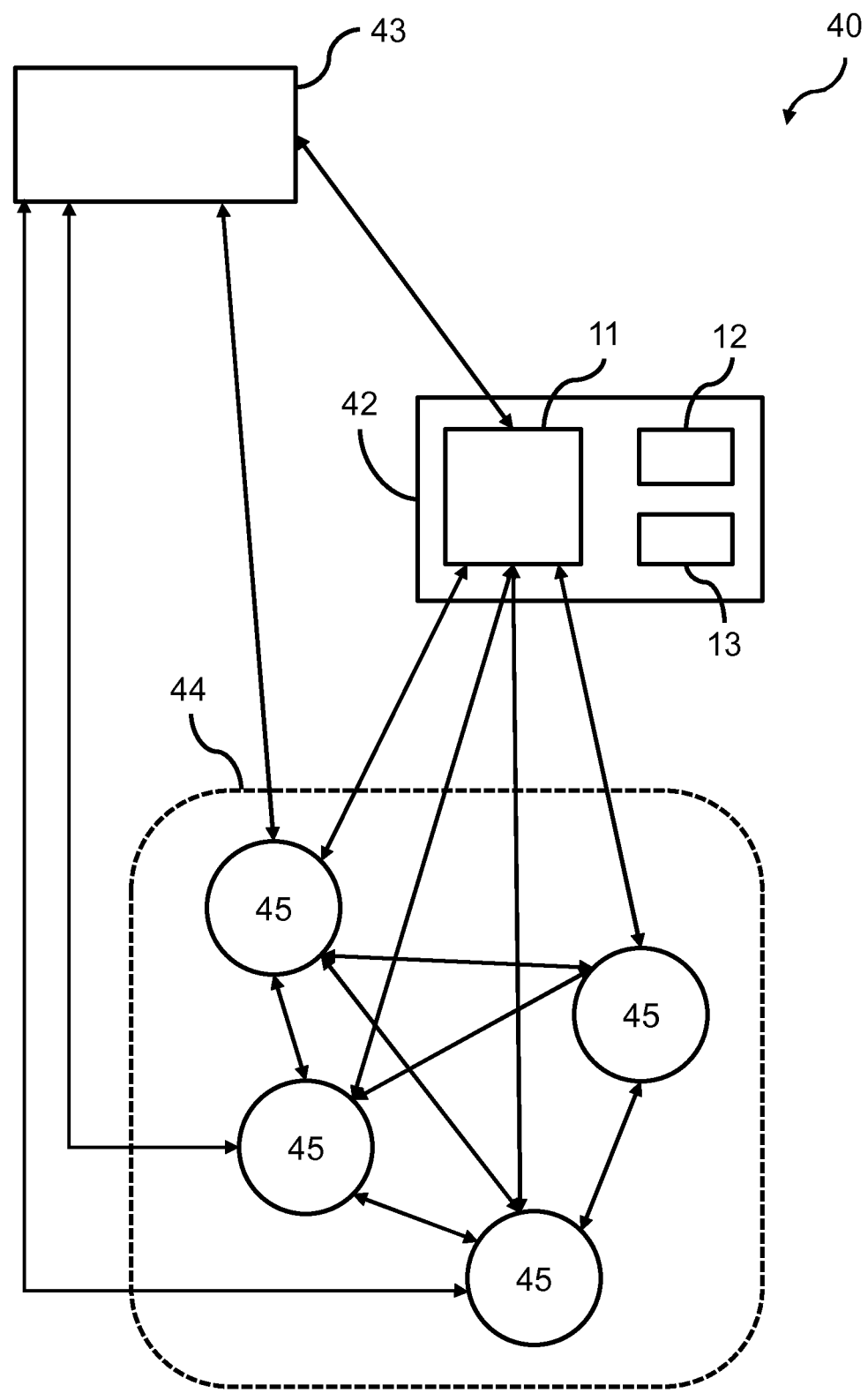
FIG. 4 conceptually depicts a communication network comprising an electronic device according to another embodiment of the invention.

FIG. 4 illustrates a second overall communication network 40 comprising an electronic device 42, an external device 43 and a network 44.

In the second communication network 40, the external device 43 is adapted to communicate with other nodes 45 (i.e. neighboring electronic devices 45) of the network 44. For example, more than one node of the network may consist of an electronic device previously described (i.e. able to communicate using a long-range and short-range wireless communication technology). Other aspects of the network 40 may be embodied as previously described.

The external device 43 may be able to communicate with the electronic device 42, operating in the short-range mode, through (one or nodes of) the network 44. Thus, the network 44 may route messages/data from the external device 43 to the electronic device 42 and vice versa. In this way, one or more neighboring electronic devices 45 may route messages from the external device 43 to the electronic device 42 and vice versa.

In this way, the external device 43 may continue to communicate with the electronic device 42, even when the electronic device is not operating in a long-range mode.

Preferably, the external device 43 is adapted to request the electronic device to switch from the short-range mode to the long-range mode. In particular, the external device may instruct a node of the network 44 to provide an override signal to the electronic device 42, the override signal being an instruction to switch to the long-range mode. Put another way, it is possible to send a message through a transceiver of a node 45 of the network 44 or a neighboring electronic device 45, operating in a long-range mode, to toggle an operating mode of the electronic device's transceiver.

The switching unit of the electronic device may therefore be able to receive an override signal from the network 44 or neighboring electronic device 45 (of the network 44); and switch the transceiver from the short-range mode to the long-range mode in response to the override signal.

Embodiments advantageously allow the external-device to wake up a long-range interface of the electronic device through a short-range interface of the electronic device. This means that an external device does not need to wait for a transceiver of the electronic device to switch back to a long-range mode. This has a particular interest for power saving capabilities in IoT devices. The external device thus does not have to wait for a wake-up time slot (e.g. when the electronic device has switched out of a sleep mode) to communicate with the electronic device.

In other examples, the capability of the neighboring devices 45 to route messages or information to the electronic device 42 from the external device 43 may be exploited to reduce traffic on the long-range communication channel.

For example, consider a scenario in which the external device 43, such as an application server, wishes to push a large firmware update to all devices in the network 44, including the electronic device 42. A node 45 of the network 44 may receive the firmware update over the long-range wireless technology and distribute it to other nodes of the network, such as the electronic device 42, using the short-range wireless technology. Thus, not all nodes need communicate with the external device 43 to receive the firmware update, minimizing communication over the more expensive long-range communication channel.

In a preferable implementation, one or more nodes of the network are woken up using an override signal to operate in the long range mode. The one or more nodes may then receive duplicates of firmware image, then further distribute the firmware update to other nodes in the network using the short-range mode. This increases an efficiency of distributing the firmware update from the external server.

The above described concepts may be applied to any transfer of data from the external device 43 to the nodes of the network 44, such as scheduling information.

Similar concepts apply in transferring data from the electronic device 42 to the external device 43, by routing the information via a neighboring electronic device in communication with the external device 43. Thus, the electronic device 42 may be adapted to pass data to a neighboring electronic device 45 to be passed to the external device 43.

Figure 5:
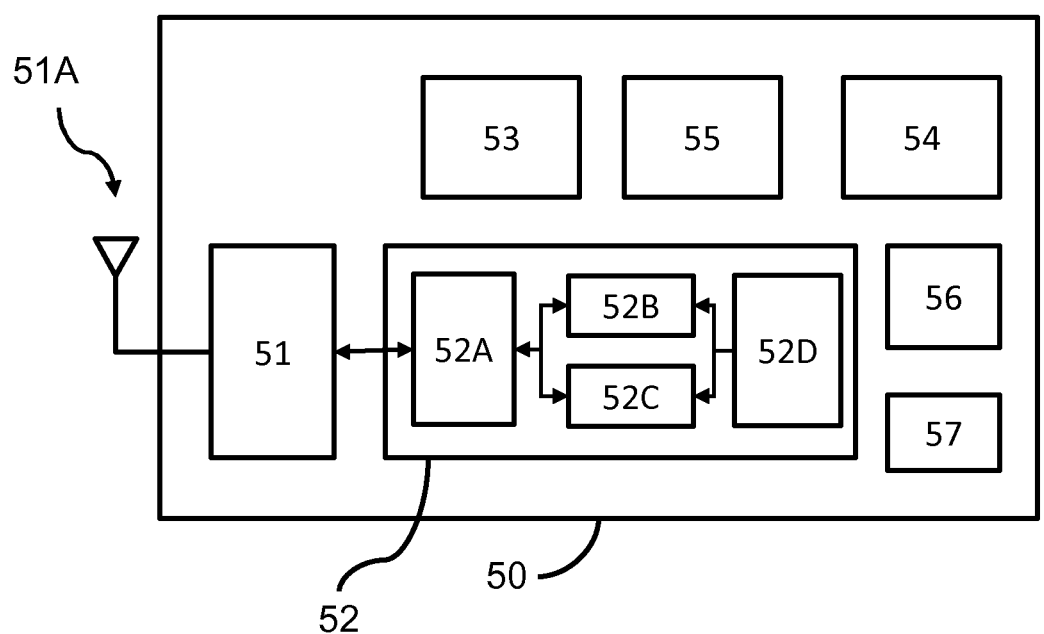
FIG. 5 illustrates a transceiver of an electronic device according to an embodiment of the invention.

FIG. 5 illustrates a transceiver 50 for an electronic device according to an embodiment. The transceiver 50 may be formed as a System-on-a-Chip.

The electronic device comprises an analog radiofrequency front end 51, a dual-mode digital baseband module 52, a processor unit 53, a host interface 54, a memory unit 55 (e.g. comprising ROM, SRAM, DRAM, a security module and/or firewall), a peripheral interface 56 and a power management unit 57.

The digital baseband module 52 is adapted to be operable in two different operating modes, the short-range mode and the long-range mode. The front end 51 and digital baseband module 52 together allow implementation of two or more basebands in the transceiver whilst sharing the same front end for data transmission and reception. Thus, only a single front end (e.g. comprising a single aerial 51A) is required for both short-range and long-range communication capabilities.

The digital baseband module 52 comprises a conversion module 52A, formed of an analogue-to-digital converter (ADC) and a digital-to-analogue converter (DAC). A first digital module 52B controls a short-range communication and a second digital module 52C operates a long-range communication. The first and second digital modules may represent aspects of a processor. A scheduler 52D controls the switching between the short-range mode and the long-range mode (i.e. acts as at least the switching unit). The processor unit 53 may process signals received from the digital baseband module 52 to act as the detection module (and control an operation of the scheduler).

Of course, more than one device of a network may be embodied as an electronic device according to any previously described method. That is, there may be provided a network, such as a mesh network, comprising more than one electronic device having a transceiver switchable between a long-range mode and short-range mode.

The network may be a lighting network, where each node of the network is a lighting device comprising a transceiver. An electronic device previously described may be embodied as a lighting device (e.g. comprise a luminaire).

Other characteristics of the power saving mode may be used to control the switching of the transceiver's operating mode, such as an identity of the power saving mode, a data transfer capacity of the power saving mode, data transfer limitations of the power saving mode and so on.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An electronic device comprising:
   a transceiver adapted to be switchable between:
   a long-range mode in which the transceiver communicates with at least one external device using a long-range wireless communication technology, wherein the long-range wireless communication technology includes two or more power saving modes, wherein the two or more power saving modes are discontinuous reception (DRX), enhanced Discontinuous Reception (eDRX) and a sleep mode where the transceiver is in an off state while maintaining an attached state with the at least one external device; and a short-range mode in which the transceiver communicates with at least one neighboring electronic device using a short-range wireless communication technology;
a detection module adapted to determine if the long-range wireless communication technology is in a power saving mode and determine which power saving mode is active by (1) obtaining/using metadata or history data of communication between the external device and the electronic device, (2) the type of long-range wireless communication technology or (3) a configuration parameter indicating the power saving mode profile it is supposed to use; and
a switching unit adapted to switch the transceiver between the short-range mode and the long-range mode based on the determined power saving mode of the long-range wireless communication technology to reduce latency of the long-range mode.

2. The electronic device of claim 1, wherein:
the electronic device is adapted to receive signals from the at least one neighboring electronic device when operating in the short-range mode; and
the switching unit is adapted to switch the transceiver from the short-range mode to the long-range mode in response to an override signal received from the at least one neighboring electronic device.

3. The electronic device of claim 2, wherein the override signal represents a request from the at least one external device to communicate with the electronic device.

4. The electronic device of claim 1, wherein the electronic device is adapted to, in response to entering the short-range mode, broadcast a presence message to the at least one neighboring electronic device.

5. The electronic device of claim 1, wherein the electronic device is adapted to, prior to exiting the short-range mode, broadcast a leave message to the at least one neighboring electronic device.

6. The electronic device of claim 1, wherein the electronic device and the at least one neighboring electronic device form, when the electronic device is operating in the short-range mode, a short-range network.

7. The electronic device of claim 1, further comprising a clock synchronization unit adapted to, when the transceiver is in the long-range mode, synchronize an internal clock of the electronic device with a clock of one of the at least one external devices.

8. The electronic device of claim 1, wherein:
the detection module is adapted to detect a period of time for which the transceiver will be unable to communicate using the long-range wireless communication technology due to the power saving mode; and
the switching unit is adapted to switch the transceiver to the short-range mode for the duration of the period of time.

9. The electronic device of claim 1, wherein the switching unit is adapted to periodically switch the transceiver between the long-range mode and the short-range mode based on the power saving mode of the long-range wireless communication technology.

10. The electronic device of claim 6, wherein the electronic device is adapted to, prior to exiting the short-range mode, nominate one or more of the at least one neighboring devices of the network to act as a buffer for data which is communicated using the short-range wireless communication technology and intended for the electronic device.

11. A method of operating a transceiver of an electronic device, wherein the transceiver is adapted to be switchable between a long-range mode in which the transceiver communicates with at least one external device using a long-range wireless communication technology wherein the long-range wireless communication technology includes two or more power saving modes, wherein the two or more power saving modes are discontinuous reception (DRX), enhanced Discontinuous Reception (eDRX) and a power saving mode where the transceiver is in an off state while maintaining an attached state with the at least one external device; and a short-range mode in which the transceiver communicates with at least one neighboring electronic device using a short-range wireless communication technology, the method comprising:
determining if the long-range wireless communication technology is in a power saving mode and determine which power saving mode is active by (1) obtaining/using metadata or history data of communication between the external device and the electronic device, (2) the type of long-range wireless communication technology or (3) a configuration parameter indicating the power saving mode profile it is supposed to use; and
reducing latency of the long-range mode by switching the transceiver between the short-range mode and the long-range mode based on the determined power saving mode of the long-range wireless communication technology.

12. The method of claim 11, further comprising:
receiving an override signal from the at least one neighboring electronic device; and
switching the transceiver from the short-range mode to the long-range mode in response to the override signal.

13. The method of claim 11, further comprising synchronizing, when the transceiver is in the long-range mode, an internal clock of the electronic device with a clock of one of the at least one external devices.

14. A computer program product comprising a plurality of program code portions, stored in a non-transitory computer readable medium, for implementing the method of claim 11 when said program is run on a computer.

* * * * *